Sept. 24, 1929.   J. M. DARBY   1,729,505
STEERING WHEEL LOCK
Filed Feb. 1, 1928   2 Sheets-Sheet 1
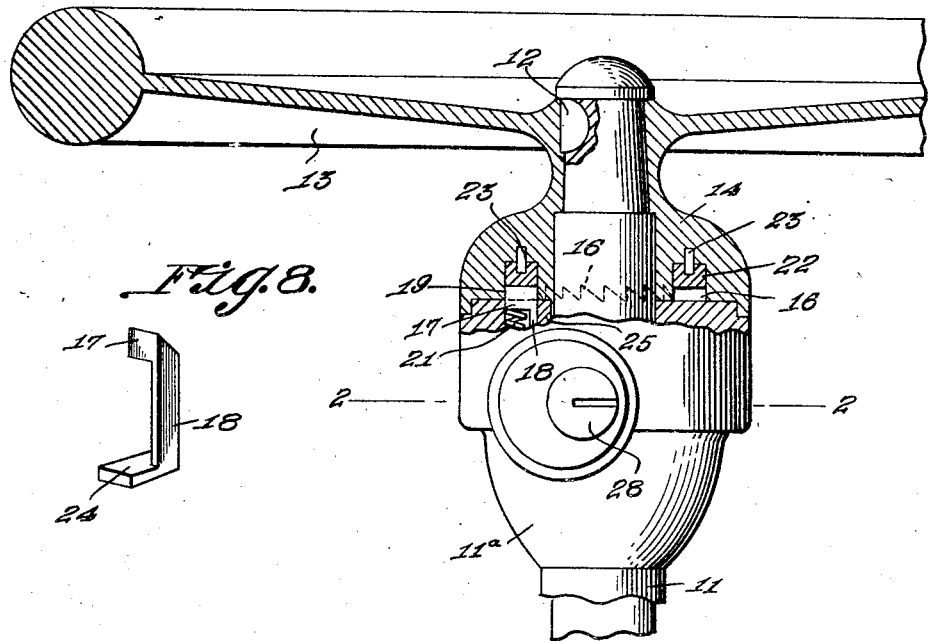
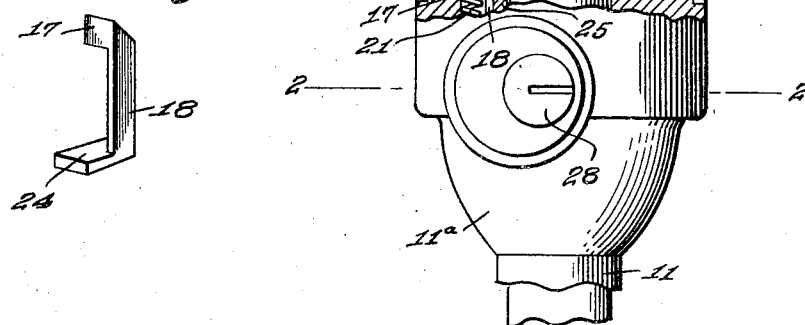
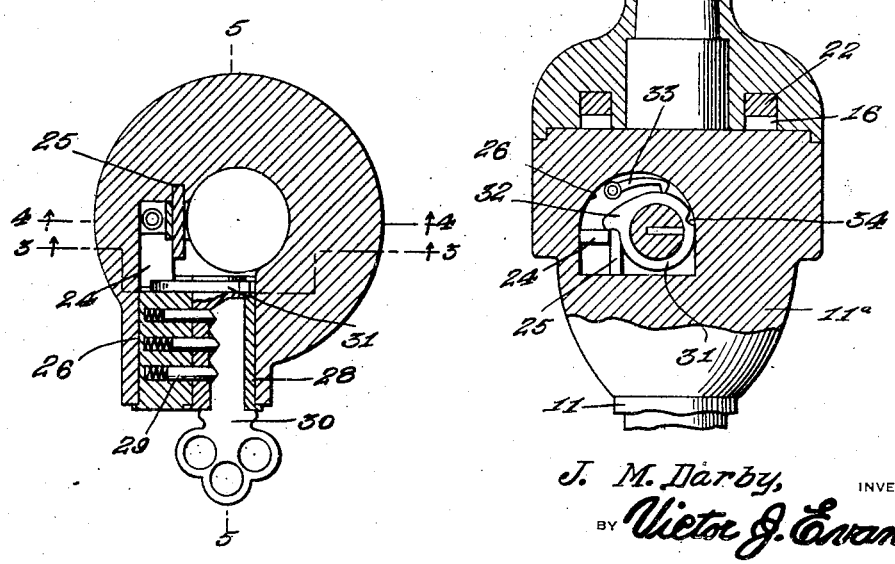
J. M. Darby, INVENTOR
BY Victor J. Evans ATTORNEY Sept. 24, 1929.                J. M. DARBY                1,729,505
                            STEERING WHEEL LOCK
                           Filed Feb. 1, 1928        2 Sheets-Sheet 2
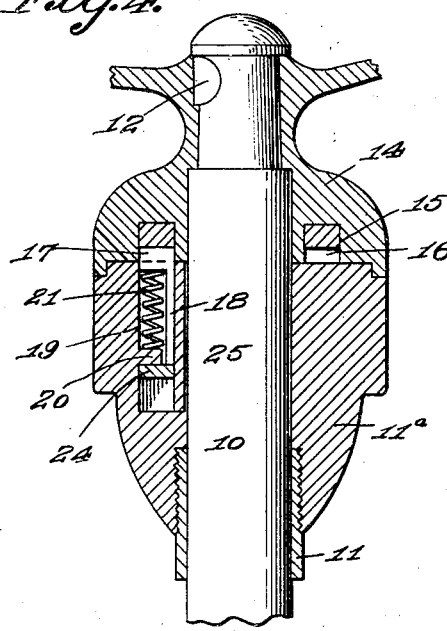
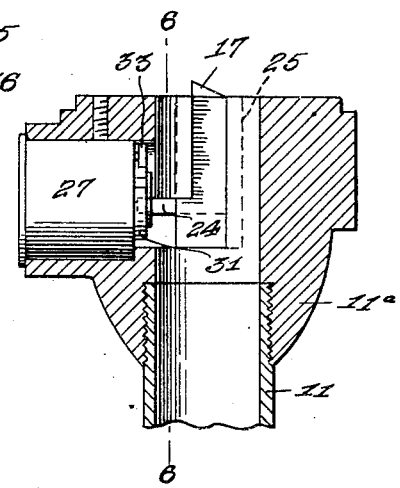
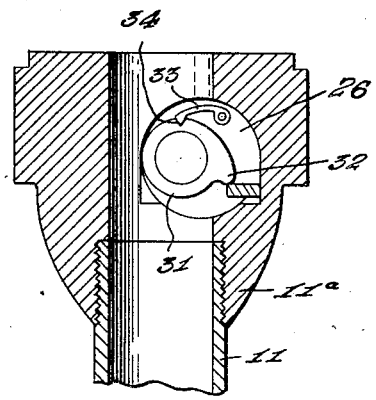
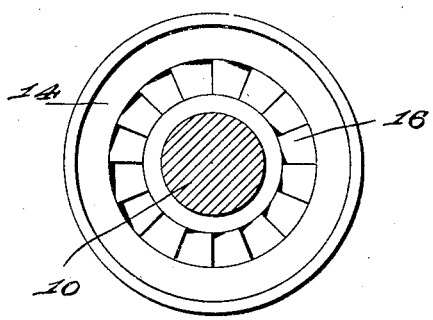
J. M. Darby,
INVENTOR
BY Victor J. Evans
ATTORNEY Patented Sept. 24, 1929

1,729,505

UNITED STATES PATENT OFFICE

JOHN M. DARBY, OF INDIANAPOLIS, INDIANA, ASSIGNOR OF ONE-HALF TO PERRY DARBY, OF INDIANAPOLIS, INDIANA

STEERING-WHEEL LOCK

Application filed February 1, 1928. Serial No. 251,168.

This invention relates to improvements in steering wheel locks, and has for an object the provision of means for locking the steering wheel of a vehicle so that in an emergency limited movement of the vehicle will be possible, but normal operation of the vehicle will be prevented.

Another object of the invention is the provision of means for locking the wheel so that the vehicle may be steered in one direction only, whereby, in the event of fire or other emergency, the vehicle may be moved within a limited area. Normal operation of the vehicle by unauthorized persons however will be prevented.

With the above and other objects in view, the invention further includes the following novel features and details of construction, to be hereinafter more fully described, illustrated in the accompanying drawings and pointed out in the appended claims.

In the drawings:—

Figure 1 is a fragmentary view partly in section showing a vehicle steering wheel equipped with the invention.

Figure 2 is a section on the line 2—2 of Figure 1.

Figures 3 and 4 are sectional views taken respectively on the lines 3—3 and 4—4 of Figure 2 and looking in the direction of the arrows.

Figure 5 is a section on the line 5—5 of Figure 2.

Figure 6 is a section on the line 6—6 of Figure 5.

Figure 7 is a plan view looking at the inner face of the steering post housing cap.

Figure 8 is a detail perspective view of the locking bolt.

Referring to the drawings in detail wherein like characters of reference denote corresponding parts, the reference character 10 indicates a portion of the steering post of a vehicle which operates within a housing 11 and to which is keyed as shown at 12, a steering wheel 13. The housing 11 is of the usual construction except that its upper end is provided with an enlarged portion 11ª, while the hub of the steering wheel is also enlarged as shown at 14 to provide a cap for the steering post housing. As the key 12 locks the wheel to the steering post 10, and, as the cap 14 forms a portion of the wheel, the cap and post will also be locked together.

The cap 14 is provided with an annular recess 15 within which are located ratchet teeth 16. These teeth are adapted to be engaged by a tooth 17 provided upon one end of a locking bolt 18 which is movable within a recess 19 provided in the enlarged portion 11ª of the steering post housing. Projecting into the recess 19 is a lug 20 which is stationary, and positioned between this lug and the tooth 17 of the locking bolt is a spring 21. This spring acts to force the locking bolt outward so that its tooth will engage the ratchet teeth 16. These teeth may be formed in the cap or they may be formed upon an annular member 22 which is keyed to the cap as shown at 23. The bolt 18 is provided with a rightangularly disposed foot 24 which operates within the recess, one wall of this recess being formed by a plate 25 which is received within a groove provided in the enlarged portion 11ª. The locking bolt is thus guided for longitudinal movement. The foot 24 is adapted to engage the lug 20 when the bolt moves outward, so that should it be necessary for any reason to remove the steering wheel, the bolt will be held within the recess.

The recess 19 includes an outwardly extending chamber 26 which is disposed at right angles to the bolt 18, and positioned within this recess is a lock mechanism 27 of suitable construction. The mechanism shown includes a rotatable key receiving member 28 and a number of spring actuated pins 29. The pins 29 normally hold the member 28 against rotation, but by inserting a key 30, the pins are arranged as shown in Figure 2 and the rotatable member may be released and operated.

Secured to the inner end of the rotatable member 28 is a cam 31 whose extended portion 32 is adapted to engage the foot 24 of the bolt 17 as shown in Figure 3 of the drawings, so that when the key is inserted in the lock and the member 28 rotated, the foot 24 will be depressed to disengage the bolt from the ratchet teeth 16. The steering wheel and steering post will thus be released and may be operated in the usual manner.

Pivotally mounted within the chamber 26 is a dog 33, which is adapted to engage within a notch 34 provided in the cam 31. This notch is so positioned that when the bolt 18 is retracted to free the steering post, the bolt will be held in retracted position. Rotation of the key 30 however will force the dog outward so as to permit of the release of the locking bolt, whereupon the latter may engage the ratchet teeth 16. When the bolt 18 and teeth 16 are engaged, the wheel 13 may be moved in one direction only (for example, the left). The vehicle may thus be moved in the event of an emergency without operating the locking bolt, so that a parked vehicle may be moved out of the way in the event of fire. The vehicle can be moved only in a circular direction, so that its normal operation by an unauthorized person will be prevented.

The invention is susceptible of various changes in its form, proportions and minor details of construction and the right is herein reserved to make such changes as properly fall within the scope of the appended claims.

Having described the invention what is claimed is:—

1. In a vehicle steering mechanism, a steering post, a steering wheel fast upon the post, a steering post housing, a steeering post housing cap fast with the wheel, ratchet teeth carried by the cap, a spring actuated bolt operating within the housing and movable upward with the steering post to engage the teeth and prevent rotation of the wheel in one direction, a cam rotatable within the housing to engage the locking bolt and operable to move said bolt and release the cap, key operated means to operate the cam and means to hold the cam in cap releasing position.

2. In a vehicle steering mechanism, a steering post, a steering wheel fast upon the post, a steering post housing, a steering post housing cap fast with the wheel, ratchet teeth carried by the cap, and a spring actuated bolt operating within the housing to engage the teeth and prevent rotation of the wheel in one direction, a rightangular foot extending from the bolt, a key operated cam mounted for rotation at rightangles to the bolt and engaging the foot to retract the bolt and release the cap, and a dog engaging the cam when the bolt is in unlocked position to hold the bolt in retracted position.

In testimony whereof I affix my signature.

JOHN M. DARBY.